United States Patent [19]
Arndt et al.

[11] 4,446,978
[45] May 8, 1984

[54] INSULATED CONTAINER

[75] Inventors: Manfred Arndt, Amstetten; Walter Breier, Geislingen; Hermann Riegert, Treffelhausen; Heinz Schmidt, Lonsee; Hermann Schwarz, Geislingen; Helmut Warneke, Ostfildern, all of Fed. Rep. of Germany

[73] Assignee: Wurttemberische Metallwarenfabrik Aktiengesellschaft, Fed. Rep. of Germany

[21] Appl. No.: 375,011

[22] Filed: May 5, 1982

[30] Foreign Application Priority Data

May 14, 1981 [DE] Fed. Rep. of Germany ....... 3119245

[51] Int. Cl.³ .............................................. A47J 41/02
[52] U.S. Cl. .................................................. 215/13 R
[58] Field of Search ........................... 215/13 R, 13 A; 220/410

[56] References Cited

U.S. PATENT DOCUMENTS

| 985,320 | 2/1911 | Baldwin | 215/13 R |
| 2,756,889 | 7/1956 | Bramming | 215/13 R |

FOREIGN PATENT DOCUMENTS

| 1429881 | 11/1968 | Fed. Rep. of Germany . | |
| 1778413 | 10/1970 | Fed. Rep. of Germany . | |
| 1393276 | 2/1965 | France | 215/13 A |

Primary Examiner—Donald F. Norton
Attorney, Agent, or Firm—Arnold, White & Durkee

[57] ABSTRACT

The invention relates to an insulated container comprising a vacuum glass body surrounded by a protective envelope consisting of an upper and a lower portion, and an adjustable tensioning means for producing a force biasing the glass body upwards into engagement with a seal adjacent the upper rim of the protective envelope.

18 Claims, 6 Drawing Figures

INSULATED CONTAINER

DESCRIPTION

In a known container of this type (DE-PS No. 1,778,413) the tensioning means is a threaded insert on the bottom of the lower portion. It is rotatable to engage a resilient support shell with the bottom of the glass body, whereby the latter is biased upwards. In the known insulated container the upper and lower portions are in threaded engagement with one another, with the threads of at least one portion being formed not on this portion itself, but on an annular plastic member provided for sealing the but joint between the upper and lower portions and for centering the glass body within the protective envelope. The known container is expensive to make. In addition to the sealing and centering ring at the but joint between the upper and lower portions it requires the support shell below the glass body, the tensioning means with its threaded components, and at least one sealing assembly for the necessary bottom opening. In a similar insulated container of simpler construction, the tensioning means is generally formed by the threaded connection between the upper and lower portions, with or without a ring member inserted therebetween, and a resilient spacer means between the glass body and the lower portion bottom. This embodiment has the disadvantage that in order to compensate for tolerances, the upper and lower portions have to overlap one another to a considerable extent, thus detracting from the appearance of the container. In all cases the lower envelope portion has to absorb the force biasing the glass body upwards. This applies also to a further known insulated container (DE-OS No. 1,429,881) wherein the lower portion of the protective envelope contains an insert substantially conforming to the interior shape of the lower portion and having the following construction: A base plate supported on the bottom of the lower envelope portion carries a surrounding wall divided by slots into individual arm members extending upwards to the connection between the upper and lower portions. The end portions of the arm members are formed with interior thread sections for connection to the upper portion. The slots are so narrow that the arm members substantially cover the peripheral wall of the glass body. The latter is additionally supported on the insert base plate by a resilient element. In this embodiment the dimensional tolerances between the plastic insert and the lower envelope portion as well as the threads of the upper portion have to be kept as small as possible. Uneven compression of the fragile glass body along the not fully continuous anular zone of its periphery may result in breakage. The strong friction occurring at this location makes it difficult, moreover, to apply a sufficiently strong upards biasing force, resulting in unreliable sealing.

It is an object of the invention to improve an insulated container of the type set forth in the introduction so as to ensure a secure and reliably sealed mounting of the glass body within the protective envelope by simple means.

The tensioning means is supported by the upper envelope portion and biases the glass body into engagement with a part of the upper portion, so that the lower envelope portion is free of stress. Since a support between the glass body and the lower portion is not required, the dimensional tolerances at least in the longitudinal direction are insignificant. By means of the tensioning means the glass body can be mounted in the upper envelope portion before the lower portion is attached thereto. Mounting of the glass body as well as its replacement, if required, is simple and can be carried out by unskilled persons. The shape of the lower envelope portion may be varied in a manner not admissible in known containers. A substantial advantage is achieved by the provision that the support elements engage the periphery of the glass body, resulting in additional protection thereof.

In an advantageous embodiment the tensioning element exerts a radial compression force on the support elements so as to thereby create an axial force. This is accomplished in a particularly simple manner in the case of a tensioning means comprising an annular base member carrying the support members in the form of circumferentially spaced web portions biased towards one another by an annular tensioning member below the bottom of the glass body. In this case the tensioning means forms an apertured housing for the portion of the glass body projecting from the upper envelope portion, said housing being connected to said upper portion. At the same time this housing structure is operative to bias the glass body inwards of said upper portion and thus into engagement with the seal adjacent the upper rim thereof.

For a secure connection of the tensioning member to the support members the latter may be formed with a curvature substantially corresponding to the contour of the glass body, with an engagement portion for engagement by the tensioning members extending therefrom substantially parallel to the axis of the glass body.

The free end of each engagement portion may additionally be formed with an outwardly angled flange rim preventing the tensioning member from slipping off and thus facilitating assembly.

The tensioning means may additionally be employed for forming the connection between the envelope upper and lower portions by providing the base member with peripheral connecting elements for attachment of the lower envelope portion. This may be accomplished in a known manner by providing thread means on the base member and on the lower envelope portion.

In a preferred embodiment, the connecting elements are formed as peripherally extending spaced projections on the base member for engagement with claws formed on the lower portion, so that the connection between the upper and lower portions forms a bayonet coupling, whereby the various parts of the container do not require threads or torsional locking means. The tensioning means consists of an integrally formed plastic body comprising the base member and the support members, and the separate tensioning member, which may be a commercially available clamp ring.

The support elements may be connected to one another or may form an integral hose structure. The hose structure may be formed by an open mesh structure or a closed wall. Contraction of the hose structure below the glass body inserted therein results in the latter being biased upwards. This effect may for instance be achieved by a suitable elasticity of the hose structure itself.

Further details and advantages of the invention will become evident from the following description of embodiments with reference to the accompanying drawings, wherein.

Figure 1:
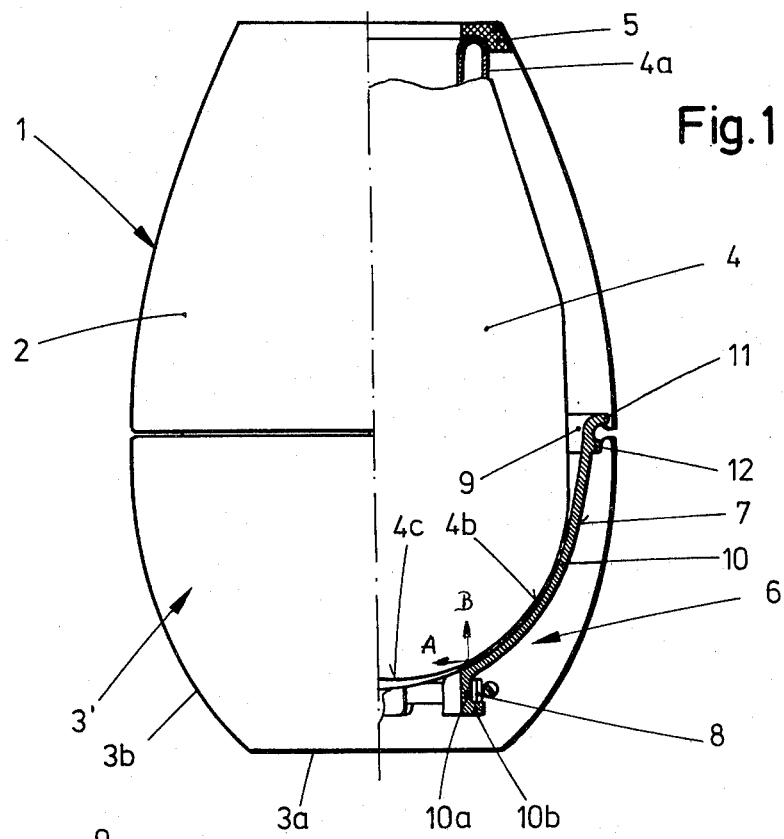
FIG. 1 shows a partially sectioned sideview of an insulated container according to the invention.

Shown in FIG. 1 in diagrammatic representation is an insulated container with the closure, handle etc. omitted. The container has a metal protective envelope 1 consisting of an upper portion 2 and a lower portion 3. Lower portion 3 is formed with a bottom 3a having an upstanding peripheral wall 3b. Envelope 1 contains an evacuated glass body 4, the upper rim 4a of which is biased into engagement with a seal 5 in upper portion 2.

Glass body 4 is supported within envelope 1 by a tensioning means 6 comprising a plastic body 7 and a tensioning member 8 in the form of a clamp ring. As seen in the perspective view in FIG. 2, plastic body 7 comprises an annular base member 9 with a number of support elements 10 in the form of web portions depending therefrom. The upper edge of base member 9 is surrounded by a sealing flange 11. Below sealing flange 11, the peripheral surface of base member 9 is formed with projections 12 serving as connecting elements for attachment of lower portion 3. In the embodiment of the plastic body shown in FIG. 2, the projections are inclined with respect to the edge of the base member in the manner of interrupted threads.

In the direction away from base member 9, web portions 10 are inclined towards one another and formed with a curvature substantially corresponding to the contour 4b of the glass body at its lower end portion. The curved portion of each web portion 10 has an engagement portion 10a extending therefrom. Engagement portions 10a extend substantially parallel to the axis of the glass body and have their free ends formed with outwards projecting flange rim portions 10b.

Figure 2:
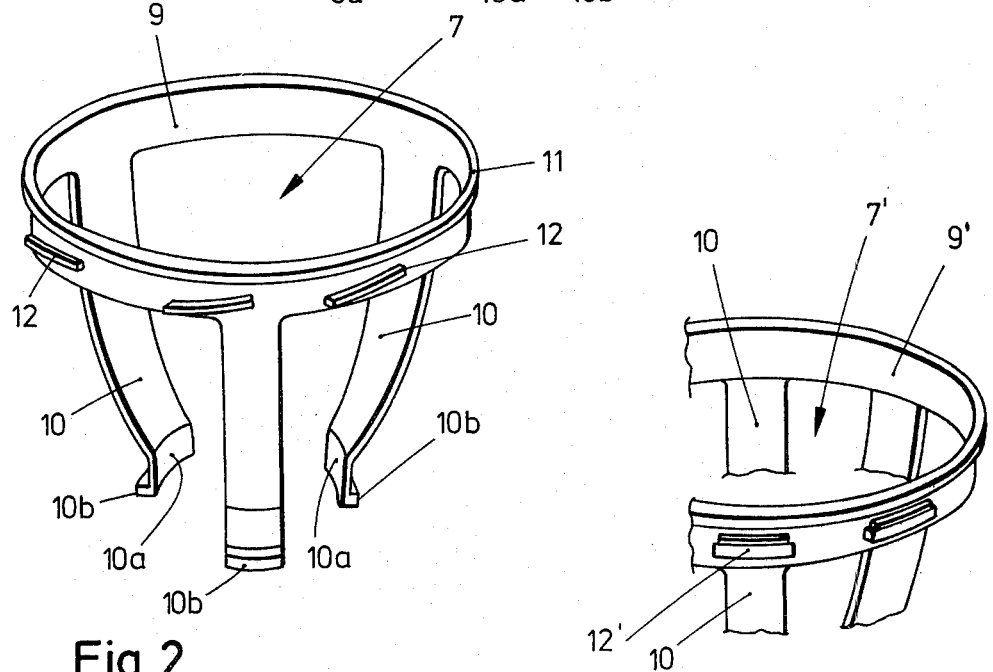
FIG. 2 shows a perspective view of a plastic body forming part of the tensioning means.

The arrangement of tensioning means 6 within envelope 1 and its function is evident from the righthand part of FIG. 1. Plastic body 7 has its annular base member 9 fixedly attached along its upper edge portion to upper envelope portion 2 as for instance by glueing. To this effect the edge of upper portion 2 is slightly flanged inwards. In the non-tensioned condition, i.e. without tensioning member 8 as shown in FIG. 2, glass body 4 may be inserted from below by resiliently bending web portions 10 apart, so as to engage seal 5. Subsequently the curved portions of web members 10 will come into surface engagement with the outer wall of glass body 4 adjacent its rounded bottom 4c. Tensioning member 8, which may be a metal or plastic clamp ring, is then positioned on engagement portions 10a in surrounding relationship. Flange rims 10b of support elements 10 prevent the tensioning member from slipping off. Subsequent tensioning of the tensioning element 8 causes support elements 10 to be pulled towards one another in the direction of arrow A, resulting in support members 10 exerting a force component in the direction of arrow B on the glass body. This force component biases upper edge 4a of glass body 4 into engagement with seal 5. The upper portion 2 of protective envelope 1 and the glass body 4 are thus completely assembled and ready for use. Envelope lower portion 3 performs only a protective function. It is now slipped onto the lower portion of glass body 4 and tensioning means 6 for attachment to plastic body 7 by means of the projections 12. In the embodiment shown in FIG. 2, this is accomplished by means of threads formed on the lower envelope portion. The sealing flange 11 of annular base member 9 will then prevent the intrusion of liquids at the but joint between the upper and lower envelope portions.

Figure 3:
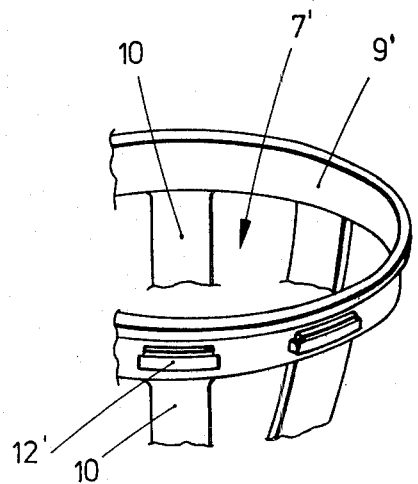
FIG. 3 shows a modified embodiment of the plastic body.

Partially shown in FIG. 3 is a plastic body 7' differring from the plastic body 7 shown in FIG. 2 by the following details: It comprises six web-shaped support elements 10 instead of three such elements as in FIG. 2. The projections 12' for attachment of lower envelope portion 3 are located adjacent the roots of support elements 10 and extend parallel to the sealing flange, i.e. exactly peripherally. They are formed as engagement members for (not shown) claws provided on lower envelope portion 3, so as to form a bayonet coupling therewith. Attachment of lower envelope portion 3 is carried out in a simple manner by inserting the claws formed thereon between adjacent projections 12'. Rotation about an angle of about 30° causes the claws to engage projections 12', whereby the lower envelope portion is rigidly attached to the upper portion. The completely assembled protective envelope has a smooth outer wall surface as shown in the lefthand part of FIG. 1, merely interrupted by the sealed but joint. The invention is not restricted to the embodiments described and shown in the drawings. The tensioning means may thus comprise a support plate or the like carried by the support members and located below the bottom of the glass body in association with a tensioning member adapted to be pushed or screwed upwards from the bottom so as to exert an upwards biasing pressure.

Figure 4:
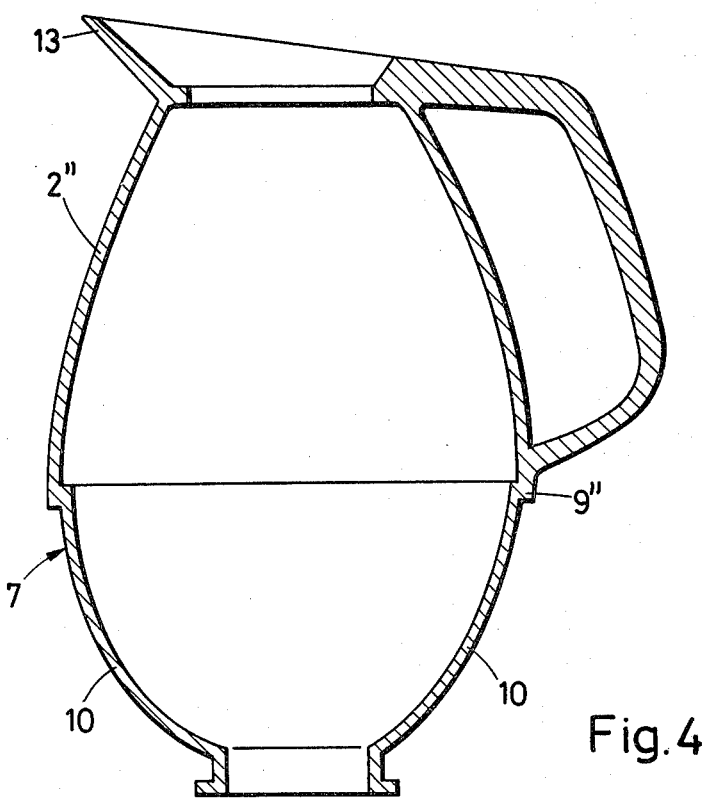
FIG. 4 shows a sectional view of a further embodiment.
Figure 5:
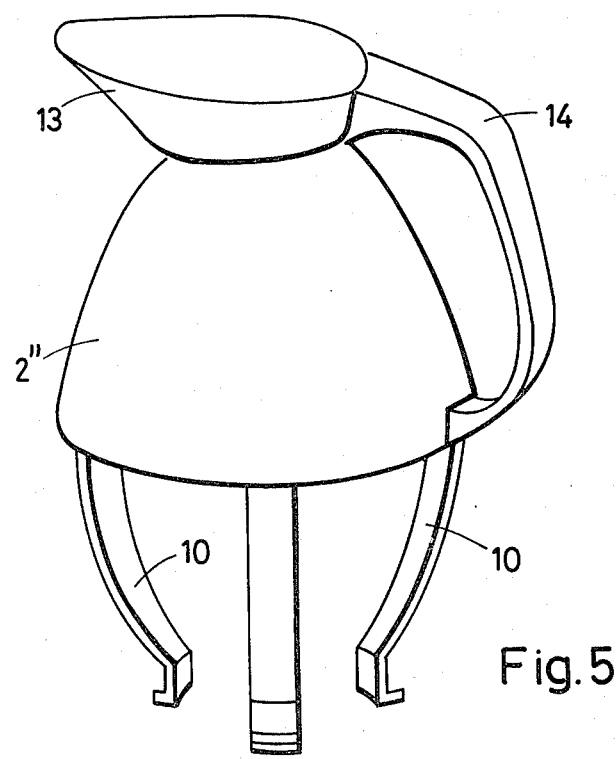
FIG. 5 shows a perspective view of the embodiment of FIG. 4.

FIGS. 4 and 5 show an envelope upper portion 2" formed of a synthetic plastic material. A spout 13 and a handle 14 as well as plastic structure 7" are formed integrally with upper portion 2" adjacent the top and bottom ends thereof, respectively. Integrally formed plastic structure 7" comprises a base member 9" formed as an annular bead around the interior lower edge of upper portion 2". Three web-shaped support elements 10 are integrally connected to base member 9" in the manner already described.

Figure 6:
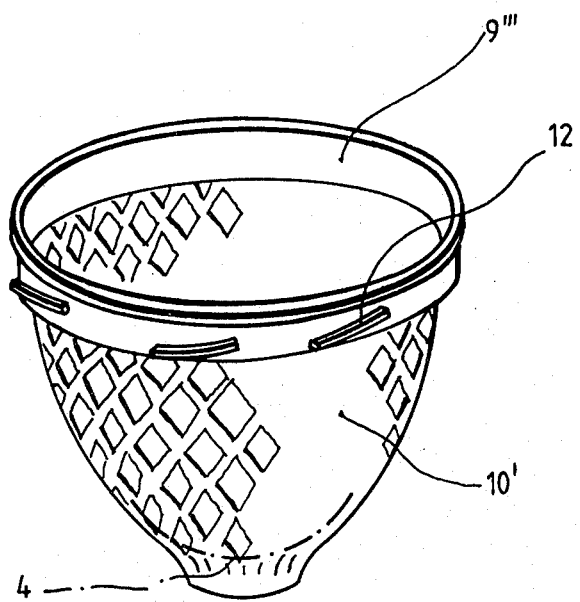
FIG. 6 shows a perspective view of a further embodiment of the tensioning means.

FIG. 6 shows the annular base portion 9''' has secured thereto a support element 10' in the form of a hose which is open at the bottom and which consists of a flexible net material. Said support element supports the glass body 4, which is outlined by the dot-dash line, by its contraction below the base of said glass body.

The invention encompasses further embodiments, wherein the support elements are connected to one another to form a hose structure attached to the upper envelope portion. The hose structure may consist of a flexible material such as fabric, netting, leather or the like, or of an elastic material such as rubber or the like.

We claim:

1. An insulated container comprising a vacuum glass body surrounded in spaced relationship by a protective envelope consisting essentially of an upper portion and a lower portion in the shape of a bottom having an upwards projecting edge, and an adjustable tensioning means for producing a force biasing the glass body upwards into engagement with a seal at the upper rim of said protective envelope, characterized in that said tensioning means (6) comprises a base portion (9) supported by said upper envelope portion, support elements (10) engaging the periphery of said glass body (4) and at least one tensioning member (8) engaging said support elements (10) and adapted to be tensioned for biasing said glass body (4) upwards relative to said base portion and said support elements.

2. An insulated container according to claim 1, characterized in that said tensioning member (8) is adapted to radially compress said support members (10) to thereby produce an axial force (B).

3. A container according to claim 2, characterized in that said base portion (9) of said tensioning means (6) is of annular shape and attached to said envelopes and upper portions (2) edge, which is abutting with said lower portion (3).

4. A container according to claim 3, characterized in that said support elements (10) are formed as circumferentially spaced web portions extending from said base portion (9) and biased towards one another by an annular tensioning member (8) below the bottom (4c) of said glass body (4).

5. A container according to claim 4, characterized in that said web portions (10) are integrally formed with said base portion (9) as a plastic structure (7).

6. A container according to claim 4 or 5, characterized in that said web portions (10) each have a curvature substantially corresponding to the contour (4b) of said glass body (4).

7. A container according to claim 6, characterized in that each web portion (10) has an engagement portion (10a) for engagement by said tensioning member (8) extending from said curvature substantially parallel to the axis of said glass body.

8. A container according to claim 7, characterized in that said engagement portion (10a) has its free end formed with an outwards angled flange rim (10b).

9. A container according to claim 1, characterized in that said base portion (9) is formed with a sealing flange (11) for sealing the abutment joint between said upper portion (2) and said lower portion (3).

10. A container according to claim 1, characterized in that said base portion (9) has its periphery formed with connecting elements (12) for attachment of said lower portion (3).

11. A container according to claim 10, characterized in that said connecting elements (12) are formed as projections (12') extending peripherally of said base portion (9) in spaced relationship to one another and serving as engagement portions for claws provided on said lower portion (3), so that the connection between said base portion (9) and said lower portion (3) forms a bayonet coupling.

12. A container according to claim 10, characterized in that said projections (12) are inclined with respect to the rim of said base portion (9) in the manner of an interrupted thread.

13. A container according to claim 10, characterized in that said projections (12 or 12') are each located adjacent the connection of said web portions (10) to said base portion (9).

14. A container according to claim 1, characterized in that said tensioning member (8) is formed as a clamp ring of metal or plastics.

15. A container according to claim 1, characterized in that said support elements are integrally connected to one another to form a flexible hose structure.

16. A container according to claim 15, characterized in that said hose structure consists of a netting or grid material.

17. A container at least according to claim 1, characterized in that said base portion is formed integrally with said envelope upper portion.

18. A container according to claim 17, characterized in that said base portion and said support elements are integrally formed with said envelope upper portion.

* * * * *